July 2, 1963
N. O. THANING
3,095,904
VALVES FOR THE CONTROL OF FLUID FLOW
Filed Dec. 27, 1960
2 Sheets-Sheet 1
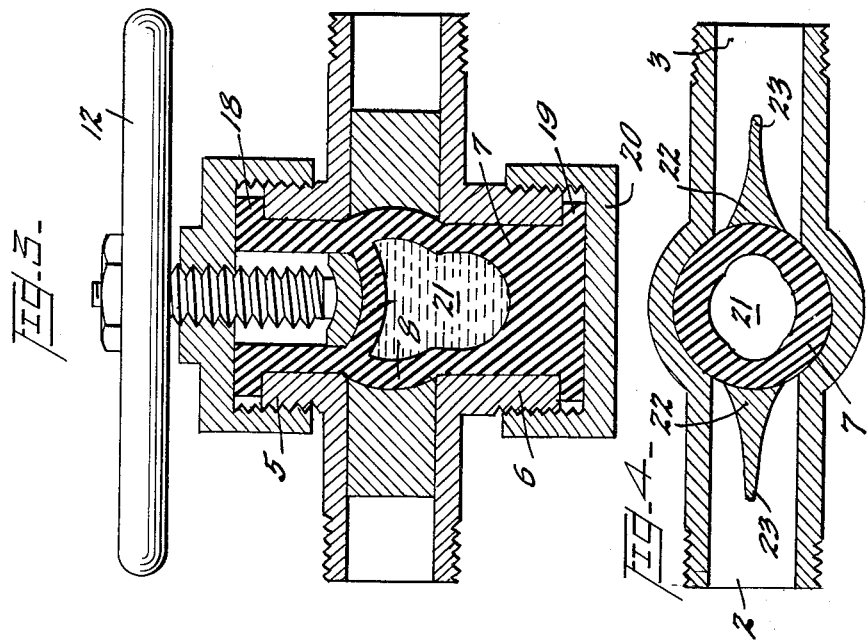
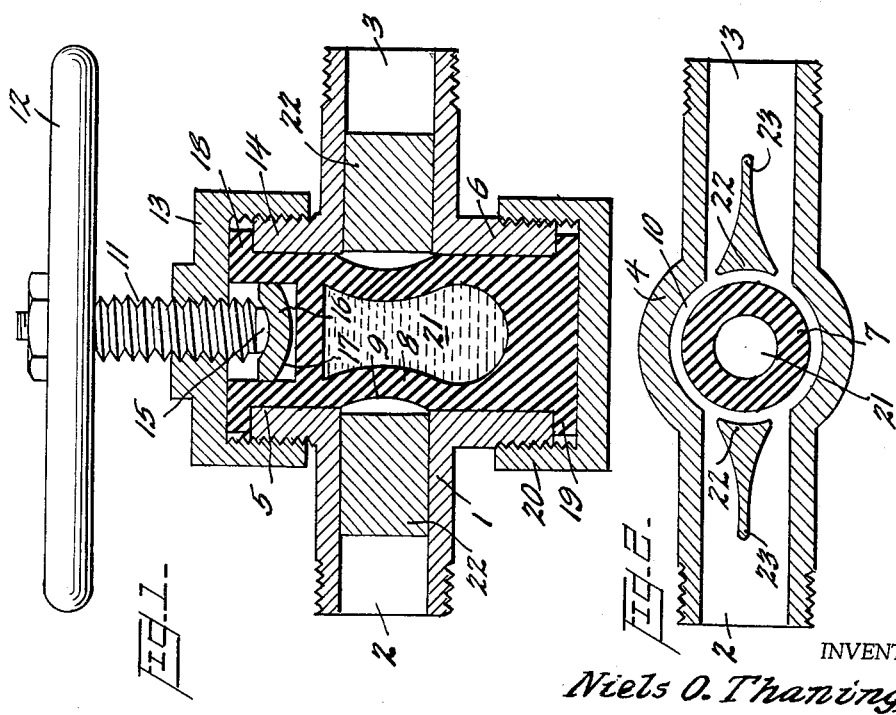
INVENTOR
Niels O. Thaning,
BY Watson, Cole, Grindle & Watson
ATTORNEYS

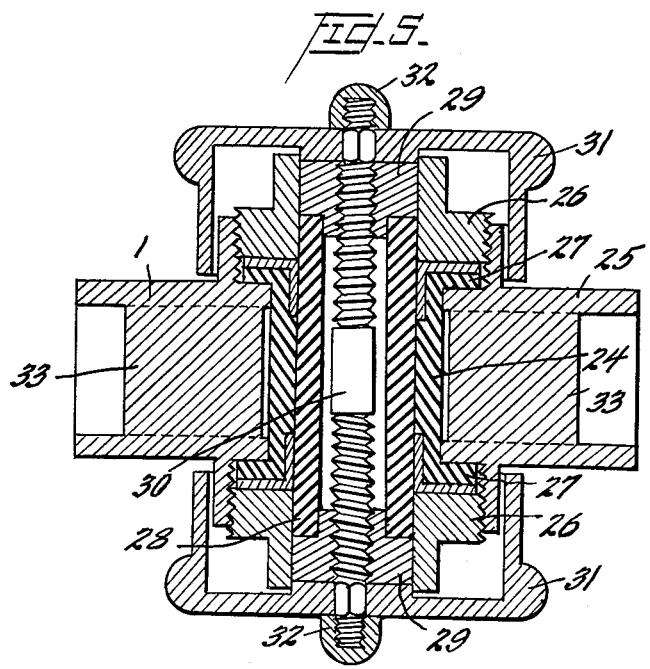
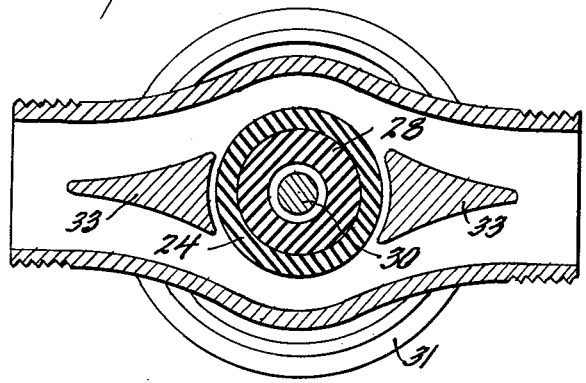

United States Patent Office 3,095,904
Patented July 2, 1963

3,095,904
VALVES FOR THE CONTROL OF FLUID FLOW
Niels Otto Thaning, International House, 61 Loveday St., Johannesburg, Transvaal, Republic of South Africa
Filed Dec. 27, 1960, Ser. No. 78,516
11 Claims. (Cl. 137—625.28)

This invention relates to valves for controlling the flow of fluids and in particular glandless valves which do not require precision ground or machined valve seats.

In valves of the type referred to, deformable resilient plugs are frequently used to effect closure of the fluid passageway through the valve and it is the object of the present invention to provide a means for ensuring the best use is made of the deformable and resilient properties of the plug members.

According to this invention there is provided a valve for the control of fluid flow comprising a valve body having a fluid passageway therethrough and around an unstressed resilient and deformable plug closure member located in the passageway and a pair of guides, one located on the inlet and one on the outlet side of the plug, said guides shaped and positioned to ensure maximum distortion of the plug at right angles to the direction of fluid flow through the valve when the latter is in the closed position.

Further features of this invention provide for the ends of the guides remote from the plug to be shaped to ensure streamlined flow of fluid past the guides and plug and for the plug to have liquid filled pockets therein.

The invention also provides for the plug to be a composite assembly of an outer deformable sleeve and a further deformable member positioned within the outer sleeve and connected to the valve operating mechanism so that deformations applied directly to the inner member are transmitted to the outer sleeve to open or close the valve.

Preferred embodiments of this invention are illustrated in the accompanying diagrammatic drawings in which:

FIGS. 1 and 3 are sectional elevations of the valve in the open and closed positions respectively, FIGS. 2 and 4 are sectional plans of FIGS. 1 and 3 respectively, and FIGS. 5 and 6 are sectional views of a valve according to this invention having a composite closure member.

As shown in FIGS. 1 to 4 the valve comprises a body 1 having oppositely disposed inlet and outlet branch connections 2, 3 respectively. The portion 4 of the body between the inlet and outlet connections is of bulbous shape and is extended upwardly and downwardly to form sockets 5 and 6 respectively. A rubber plug 7 of generally cylindrical shape extends between the sockets 5 and 6 and the portion 8 of the plug extending through the bulbous portion 4 of the body is waisted as shown at 9 when in its normal unstressed condition so that curved fluid passageways 10 are formed between the plug and bulbous portion 4 of the body connecting the inlet 2 and outlet 3 of the latter as shown.

A threaded spindle 11 fitted with a handwheel 12 is screwed through a cap nut 13 onto the socket 5, the upper portion 14 of which is externally threaded to receive the cap nut 13 and the bottom 15 of the spindle 11 bears on a washer, pressure plate or the like 16 in a recess 17 at the top of the plug 7.

The plug 7 has outwardly directed flanges 18 and 19 at top and bottom and the flange 18 is held in sealing engagement with the top of socket 5 by means of the cap nut 13. The flange 19 is similarly held against the end of socket 6 by a similar but unperforated cap nut 20.

To close the valve the spindle 11 is screwed inwardly to compress the plug 7 axially resulting in the waisted portion 8 expanding laterally or diametrically. The degree of closure of the valve depends on the degree of axial compression of the plug 7 full closure being effected when the waisted portion 8 of the plug 7 has bulged outwardly sufficiently to press against the internal wall of the bulbous portion 4 of the body as shown in FIGS. 2 and 4. The valve is opened by unscrewing the spindle 11 to allow the plug to extend in an axial direction due to its inherent resilience with consequent reduction in the cross-sectional area of the central portion of the plug which will assume its normal waisted shape when the compressive stress thereon is fully relieved.

The centre portion of the plug 7 may be provided with a pocket 21 to facilitate the distortion thereof, said pocket preferably being filled with a liquid.

To ensure that the deformable plug 7 is expanded to a maximum degree substantially at right angles to the direction of fluid flow through the valve that is, into the bulbous portion 4 of the body 1, guides 22 are fitted in fluid passageway and against which the plug will expand when the valve is closed. These guides 22 also fulfill a further purpose in that the ends 23 remote from the plug 7 are shaped to assist in maintaining a streamlined flow of fluid around the plug 7 when the valve is in the open position. It will be appreciated that the guides 22 may be made as integral parts of the body 1.

The invention also provides for the plug to be made as a composite assembly which facilitates sealing of all the moving parts of the valve and it enables the directly stressed portion to be made of a material most suitable to withstand these stresses while the indirectly stressed portion may be of a softer material ensuring good sealing qualities and/or wear, corrosion or chemical resistance according to requirements. This construction is described in one form below which will enable the whole centre portion of the closure plug and the valve operating mechanism to be removed and repaired or replaced without interfering with the seal between the outer portion of the plug and the valve body.

The embodiment shown in FIGS. 3 and 4 utilises a resilient sealing sleeve 24 which is held in sealing engagement with the valve body 25 by the threaded plugs 26 which clamp the sleeve flanges 27 in the top and bottom spigot portions of the valve body 1. Inside the sleeve 24 is an annular resilient core 28 with the ends thereof positioned between stops in the form of the nuts 29 shown and to which said ends may be bonded or otherwise secured. A spindle 30 is threaded through the nuts 29 and has a left and right hand threaded portion, one screwed through each nut so that on rotation of the spindle 30 the nuts 29, sliding in the plugs 26 will either be positively drawn together or positively moved apart. The drawing of the nuts together will bulge the core 28 and sleeve 24 outwardly to close or partially close the valve in a manner similar to that described in relation to FIGS. 1 to 4.

Rotation of the spindle 30 to effect such movement is done by the handwheels 31 of which it will be noted that there is one attached to each end of the spindle 30 by nuts 32 so that the valve may be operated from either side. If desired, however, the one handwheel may be replaced by a plate.

What I claim as new and desire to secure by Letters Patent is:

1. A valve for controlling the flow of fluid comprising a valve body, a resilient and deformable plug closure member in said body, said plug comprising an outer deformable sleeve, a rotatable spindle positioned across the passageway, a pair of stops around said spindle and a second resilient sleeve on said spindle and between said stops screw threads of opposite hands on each end of the spindle and the stops in the form of nuts one on each end of the spindle, a passageway through the body and around said plug in the unstressed condition, and a pair of guides one positioned on each side of said plug, said guides shaped to ensure maximum distortion of the plug at right angles to the direction of fluid flow through the valve when the latter is closed, and valve operating handwheel assemblies associated with each spindle end.

2. A valve for controlling the flow of fluid comprising a valve body, a resilient and deformable plug closure member in said body, at least one hollow pocket formed in said plug, a passageway through the body and around said plug in the unstressed condition, and a pair of guides one positioned on each side of said plug, said guides shaped to ensure maximum distortion of the plug at right angles to the direction of fluid flow through the valve when the latter is closed.

3. A valve as defined in claim 2 wherein the pocket is filled with liquid.

4. A valve for controlling the flow of fluid comprising a valve body, a passageway for fluid flow through the body, a resilient and deformable plug closure member extending across and partly blocking the passageway, a pair of guides in the passageway positioned one on the downstream and one on the upstream side of the plug respectively, and both guides being in close proximity to said plug, means for compressing the plug to effect outward distortion thereof for controlling fluid flow past the plug, said guides being shaped to ensure a major degree of such outward distortion of the plug in a direction at right angles to said fluid flow.

5. A valve as in accordance with claim 4 including portions of the guides extending away from the plug, said portions being of streamlined shape.

6. A valve in accordance with claim 4 wherein the guides form integral parts of the valve body.

7. A valve in accordance with claim 4 in which the plug comprises an outer deformable sleeve and a further deformable sleeve positioned within the outer sleeve and the means for compressing the plug comprises an operating mechanism connected to deform the inner sleeve and thereby deform the outer sleeve.

8. A valve as claimed in claim 4 including a body wall defining the passageway through the body, apertures in said wall, outwardly projecting internally screw threaded sockets around said apertures, and in which the said plug comprises an outer deformable sleeve and a further deformable sleeve positioned within the outer sleeve, flanges on the outer sleeve and ring nuts screwed into said sockets to retain the flanges in sealing engagement with the valve body.

9. A valve in accordance with claim 8 including a spindle projecting axially through the inner sleeve, a pair of stops on said spindle and between which the inner sleeve is located and means for rotating the spindle to move the stops relative to each other on rotation of the spindle.

10. A valve for the control of fluid flow comprising a valve body, a passageway through said body, oppositely disposed apertures through the walls of said passageway, a composite plug located in said passageway between the apertures, an annular fluid path around said plug in the passageway, said plug having an outer deformable sleeve positioned across the passageway, ends for the sleeve retained in sealing engagement around the apertures, a further deformable member positioned within said sleeve, guides in the valve body positioned one on either side of said plug and adapted to ensure that the outer sleeve is bulged to a maximum degree at right angles to the direction of fluid flow through the valve, and an operating mechanism for said valve connected to said further member and adapted to deform said further member which is adapted in turn to deform said sleeve to close the annular fluid path around said composite plug.

11. A valve as defined in claim 10 wherein the ends of the guides remote from the plug are shaped to facilitate streamlined flow of fluid past the plug when the valve is open.

References Cited in the file of this patent

UNITED STATES PATENTS 2,886,281     Canalizo _____ May 12, 1959

FOREIGN PATENTS 903,769     Germany _____ Dec. 24, 1953